United States Patent
Dharampurikar et al.

(10) Patent No.: US 12,511,136 B2
(45) Date of Patent: Dec. 30, 2025

(54) JAVASCRIPT OBJECT NOTATION CONFIGURATION FILE GENERATION AND NETWORK FUNCTION IMPLEMENTATION METHOD AND APPARATUS

(71) Applicant: Rakuten Mobile, Inc., Tokyo (JP)

(72) Inventors: Aaditya Dharampurikar, Indore (IN); Rahul Gupta, Indore (IN); Aman Vijayvargiya, Indore (IN); Biplav Kumar, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 332 days.

(21) Appl. No.: 18/007,462

(22) PCT Filed: Nov. 17, 2022

(86) PCT No.: PCT/US2022/050181
§ 371 (c)(1),
(2) Date: Jan. 30, 2023

(87) PCT Pub. No.: WO2024/107189
PCT Pub. Date: May 23, 2024

(65) Prior Publication Data
US 2024/0256298 A1 Aug. 1, 2024

(51) Int. Cl.
*G06F 9/451* (2018.01)
*G06F 3/0484* (2022.01)
*H04L 41/0803* (2022.01)

(52) U.S. Cl.
CPC ............ *G06F 9/451* (2018.02); *G06F 3/0484* (2013.01); *H04L 41/0803* (2013.01)

(58) Field of Classification Search
CPC ..... G06F 9/451; G06F 3/0484; H04L 41/0803
See application file for complete search history.

(56) References Cited

U.S. PATENT DOCUMENTS

| | | | | |
|---|---|---|---|---|
| 5,832,503 | A | * | 11/1998 | Malik ..................... H04L 41/20 707/999.01 |
| 2002/0069274 | A1 | * | 6/2002 | Tindal ................. H04L 41/0895 709/224 |

(Continued)

OTHER PUBLICATIONS

"Microsoft® Office", taken from https://download.microsoft.com/download/5/0/1/501ED102-E53F-4CE0-AA6B-B0F93629DDC6/Office/Excel97-2007BinaryFileFormat(xls)Specification.pdf, published 1997, pages c, cc, and 11 (Year: 1997).*

*Primary Examiner* — William L Bashore
*Assistant Examiner* — Gregory A Distefano
(74) *Attorney, Agent, or Firm* — HAUPTMAN HAM, LLP

(57) ABSTRACT

A method includes processing a data file including one or more parameters for configuring a network function provided by a network device. The data file is processed to recognize and extract the one or more parameters included in the data file. The method also includes causing one or more of a plurality of parameter fields included in a graphical user interface to be populated with the one or more parameters extracted from the data file according to a mapping between the one or more parameters extracted from the data file and corresponding parameter fields included in the graphical user interface. The method further includes processing parameters included in the parameter fields to generate a JavaScript Object Notation (JSON) configuration file. The method additionally includes causing the JSON configuration file to be sent to the network device to implement the network function according to the JSON configuration file.

20 Claims, 5 Drawing Sheets

(56) References Cited

U.S. PATENT DOCUMENTS

| | | | |
|---|---|---|---|
| 2003/0200288 A1* | 10/2003 | Thiyagarajan | H04L 41/0869 709/221 |
| 2005/0235063 A1* | 10/2005 | Wilson | H04L 67/34 709/227 |
| 2009/0083398 A1* | 3/2009 | Ford | G06F 15/177 709/220 |
| 2014/0279864 A1* | 9/2014 | Lopyrev | G06F 16/258 707/755 |
| 2014/0365624 A1* | 12/2014 | Whittemore | H04L 41/0806 709/221 |
| 2015/0281387 A1* | 10/2015 | Barreto | H04L 67/04 709/203 |
| 2017/0031723 A1* | 2/2017 | George | G06F 16/252 |
| 2018/0136951 A1* | 5/2018 | Palavalli | G06F 9/44505 |
| 2021/0389975 A1* | 12/2021 | Ahammed | G06F 9/52 |
| 2022/0050670 A1* | 2/2022 | Liljeback | G06F 9/4881 |
| 2022/0269534 A1* | 8/2022 | Misra | G06F 15/7889 |
| 2023/0239207 A1* | 7/2023 | Parashar | H04L 41/0859 709/220 |
| 2024/0151859 A1* | 5/2024 | Priyanto | G01S 5/012 |

* cited by examiner

Configuration Manager

Search | Search Names

Configuration File List

| UHN | NS Version | NS ID | Technology | Equip Type | NE Version | NF Type | NF Label | Vendor Domain | Day 1 Status | Day 2 Status | Data Model Type |
|---|---|---|---|---|---|---|---|---|---|---|---|
| ABC | 123 | XYZ | Tech A | XYZ | 123 | NF1 | A1 | NNN | Succ/Fail/Pend | Succ/Fail/Pend | JSON |

FIG. 3

Configuration Manager

Parameters

- UHN Name/UUID ▽
- Domain ▽
- Technology ▽
- Search Apps
- Apps ▽
- Network Service Provider ▽
- IP ▽
- Port ▽
- Additional Details ▽
- Software Version ▽

Upload Data File

Drag/Drop Data File Here

Upload

Submit/Save

Cancel

Back

300

301

(12) United States Patent

JAVASCRIPT OBJECT NOTATION CONFIGURATION FILE GENERATION AND NETWORK FUNCTION IMPLEMENTATION METHOD AND APPARATUS

RELATED APPLICATIONS

The present application is a National Phase of International Application No. PCT/US2022/050181, filed Nov. 17, 2022.

TECHNICAL FIELD

The present disclosure is related to generating a JavaScript Object Notation (JSON) configuration file that is sent to a network device for implementing a network function.

BACKGROUND

Network operators, network service providers and device manufacturers (e.g., wireless, cellular, etc.) are continually challenged to deliver value and convenience to consumers by, for example, providing compelling communication networks and network services that are dependable and capable of being flexibly constructed, scalable, diverse, and economically operated.

SUMMARY

An aspect of this description is related to a method that comprises processing, by a processor, a data file comprising one or more parameters for configuring a network function provided by a network device. The data file is processed to recognize and extract the one or more parameters included in the data file. The method also comprises causing one or more of a plurality of parameter fields included in a graphical user interface to be populated with the one or more parameters extracted from the data file according to a mapping between the one or more parameters extracted from the data file and one or more corresponding parameter fields of the plurality of parameter fields included in the graphical user interface. The method further comprises processing parameters included in the parameter fields in the graphical user interface to generate a JavaScript Object Notation (JSON) configuration file. The method additionally comprises causing the JSON configuration file to be sent to the network device to implement the network function in accordance with the JSON configuration file.

Another aspect of this description is related to an apparatus comprising a processor and a memory having instructions stored thereon that, when executed by the processor, cause the apparatus to process a data file comprising one or more parameters for configuring a network function provided by a network device. The data file is processed to recognize and extract the one or more parameters included in the data file. The apparatus is also caused to cause one or more of a plurality of parameter fields included in a graphical user interface to be populated with the one or more parameters extracted from the data file according to a mapping between the one or more parameters extracted from the data file and one or more corresponding parameter fields of the plurality of parameter fields included in the graphical user interface. The apparatus is further caused to process parameters included in the parameter fields in the graphical user interface to generate a JavaScript Object Notation (JSON) configuration file. The apparatus is additionally caused to cause the JSON configuration file to be sent to the network device to implement the network function in accordance with the JSON configuration file.

Another aspect of this description is related to a non-transitory computer readable having instructions stored thereon that, when executed by a processor, cause an apparatus to process a data file comprising one or more parameters for configuring a network function provided by a network device. The data file is processed to recognize and extract the one or more parameters included in the data file. The apparatus is also caused to cause one or more of a plurality of parameter fields included in a graphical user interface to be populated with the one or more parameters extracted from the data file according to a mapping between the one or more parameters extracted from the data file and one or more corresponding parameter fields of the plurality of parameter fields included in the graphical user interface. The apparatus is further caused to process parameters included in the parameter fields in the graphical user interface to generate a JavaScript Object Notation (JSON) configuration file. The apparatus is additionally caused to cause the JSON configuration file to be sent to the network device to implement the network function in accordance with the JSON configuration file.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is a diagram of a graphical user interface, in accordance with one or more embodiments.

DETAILED DESCRIPTION

Figure 1:
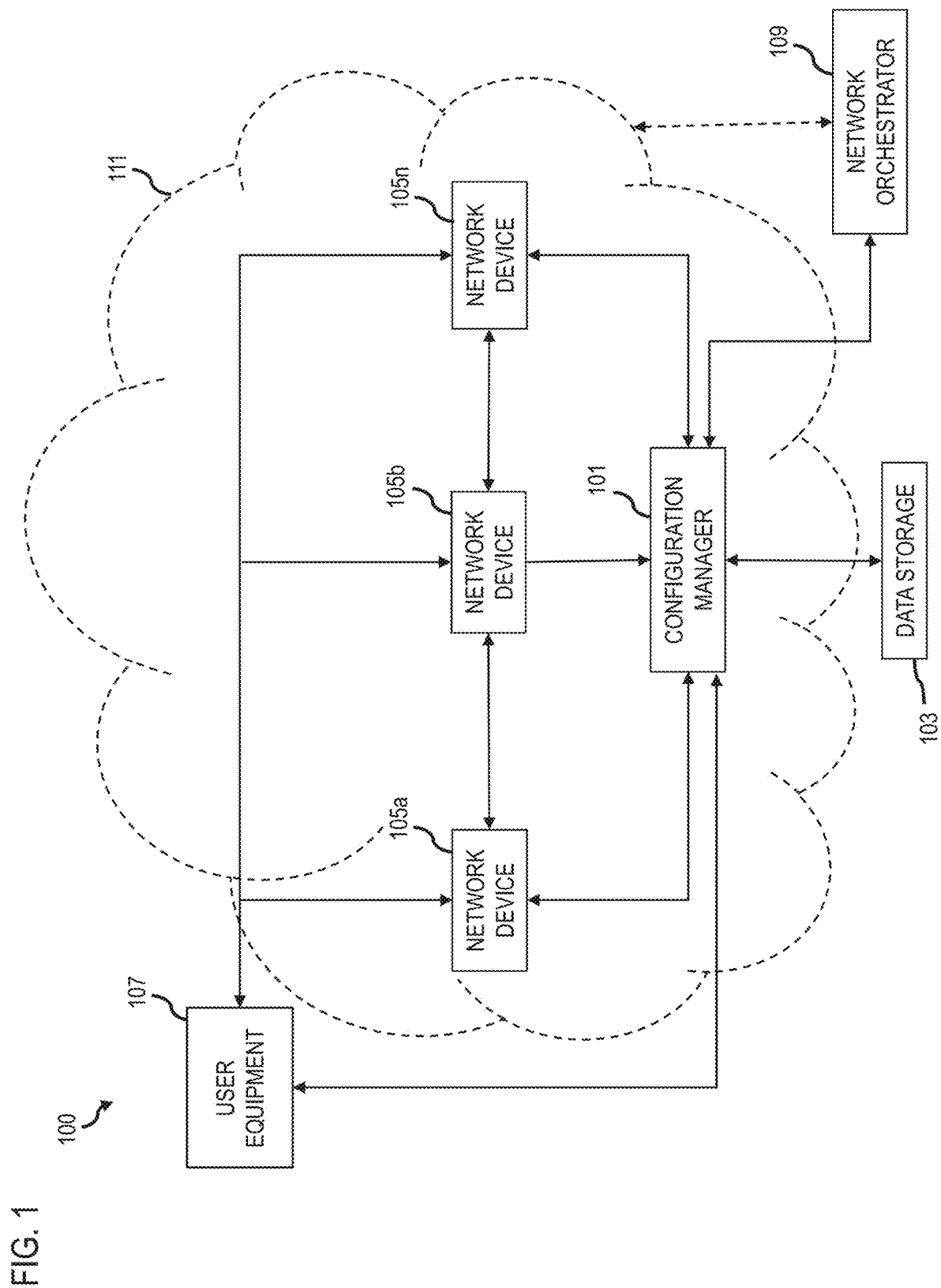
FIG. 1 is a diagram of a communication system, in accordance with one or more embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows may include embodiments in which the first and second features are formed or positioned in direct contact, and may also include embodiments in which additional features may be formed or positioned between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of an apparatus or object in use or operation in addition to the orientation depicted in the figures. The apparatus may be otherwise oriented (rotated 90 degrees or at other orientations) and the spatially relative descriptors used herein may likewise be interpreted accordingly.

Communication networks and network services are often provided by static or inflexible systems that are difficult to configure, scale, and deploy over various target areas. Network operators sometimes coordinate and deploy communication networks and/or network services that include network services (e.g., hardware, software, etc.) provided by one or more network service providers. To facilitate the provision of communication networks and network services, various network functions are implemented by one or more network devices associated with the communication network. Such communication networks often involve network services across multiple domains such as radio area network (RAN), base station subsystem (BSS), platform, core network, etc., various technologies (such as 3G, 4G, LTE, 5G, etc.), multiple locations, various software interfaces, multiple devices, etc. that are proprietary and/or optimized by a specific network service provider.

As the communication network evolves and improves, a single communication network may involve an ever-changing quantity of network service providers for providing network services and/or that are associated with providing network services associated with various aspects of the communication network (e.g., domains, technologies, locations of services, etc.) and, as a result, the state of the communication network may vary dynamically with the addition and/or subtraction of network service providers, a change in one or more network services, network functions, etc.

Newly developed software or applications go through an onboarding process. Part of the onboarding process often involves pushing configuration files to one or more network devices. Conventionally, a network orchestrator is involved in the configuration and onboarding of network services and network functions. Such a network orchestrator is usually managed by a network operator to control the communication network such that network service providers are reliant on the network orchestrator for configuration of dynamic parameters and for pushing a configuration file to the network device(s). As a result, network service providers are unable to directly control or initiate a configuration push to configure the network function and/or network device. In other words, network service providers are dependent upon the network orchestrator to initiate a configuration push.

Sometimes, a network service provider initiates a configuration push by uploading a configuration file in a particular format such as JavaScript Object Notation (JSON), Extensible Markup Language (XML), or some other suitable formatting or file type.

Network service providers often manually generate JSON configuration files for uploading to the network orchestrator so that the network orchestrator may then push the JSON configuration files to the appropriate network devices. This conventional process is susceptible to human error and delay. For example, with the manual generation of the JSON configuration file, a user needs to keep a track of the parameter repetition along with correct identifier details, which is a tedious task, along with other human-related errors such as typographical error, mistaken inputs, interpretational issues, etc., which makes validating a manually generated JSON configuration file more cumbersome. Delays caused by error prone manual processes for generating JSON configuration files and wait times caused by dependencies on a network orchestrator, because a network service provider cannot push a configuration to a network device on demand, can result in communication network dependability issues, reduced quality of service, and increased costs.

FIG. 1 is a diagram of a communication system 100, in accordance with one or more embodiments. System 100 makes it possible to automatically generate a JSON configuration file based on a data file and/or one or more user inputs provided by a network service provider. System 100 also facilitates the implementation of a network function by pushing the generated JSON configuration one or more network devices outside of a network orchestrator.

System 100 comprises configuration manager 101, data storage 103, one or more network devices 105a-105n (collectively referred to as network devices 105), user equipment (UE) 107, and a network orchestrator 109. Configuration manager 101, data storage 103, the one or more network devices 105, UE 107 and/or network orchestrator 109 are communicatively coupled by way of a communication network 111. In some embodiments, the communication network 111 is orchestrated by the network orchestrator 109 which combines a plurality of network services provided by one or more network service providers via the network devices 105.

In some embodiments, configuration manager 101 comprises a set of computer readable instructions that, when executed by a processor such as a processor 503 (FIG. 5), causes configuration manager 101 to perform the processes discussed in accordance with one or more embodiments.

In some embodiments, configuration manager 101 is remote from the network devices 105. In some embodiments, configuration manager 101 is at least partially implemented by a UE 107. In some embodiments, configuration manager 101 is a part of one or more of the network devices 105. In some embodiments, one or more processes the configuration manager 101 is configured to perform and/or components of the configuration manager 101 is divided among one or more of the network devices 105, one or more UE 107's and/or one or more processors remote from the one or more network devices 105 and/or the one or more UE 107's.

Data storage 103 is a memory such as a memory 505 (FIG. 5) capable of being queried or caused to store data in accordance with one or more embodiments. In some embodiments, data storage 103 has searchable information stored therein that includes stored information associated with the communication network 111 such as network device 105 identifiers, physical cell identities (PCIs), frequency information, root sequence indexes, preamble information, key performance indicator (KPI) data, network function configuration parameters, network device configuration parameters, other suitable configuration information, or other suitable system data.

Configuration manager 101 is configured to automatically generate a JSON configuration file and send the JSON configuration file to one or more network devices 105 by way of a communication channel external to the network orchestrator 109. Automatically generating a JSON configuration file and sending the JSON configuration file by way of a communication channel external to the network orchestrator 109 helps to improve network dependability while enhancing the scalability of the communication network by deploying network function changes, updates, removals and/or additions in a timely and cost-effective manner while reducing an impact on system resources. For example, without relying on manual processes for generating a JSON configuration file and/or the network orchestrator 109 to initiate pushing the JSON configuration file to the network devices, a network function can be changed, updated, removed and/or added in a manner that reduces response time, decreases costs, and increases user confidence in the dependability of the communication network.

In some embodiments, the configuration manager 101 generates a graphical user interface that is output to a display by way of a UE 107 or a terminal associated with the configuration manager 101 for a user (e.g., a network service provider), so as to allow the user to generate a JSON configuration file for implementing a network function and for causing the JSON configuration file to be sent to one or more of the network devices 105 to implement a network function. In some embodiments, the graphical user interface is accessible via a web browser such as by way of a website or a web browser plug-in.

In some embodiments, the graphical user interface is configured to facilitate the uploading of a data file comprising one or more parameters for configuring a network function provided by one or more of the network devices 105 to configuration manager 101. The data file is processed to recognize, parse and extract the one or more parameters included in the data file. In some embodiments, the data file is a raw data file that is in a binary interchange file format (BIFF), is a .xls file, or in some other suitable format.

In some embodiments, the graphical user interface comprises a plurality of parameter fields that are usable for indicating values or information that are applicable for configuring the network function. The configuration manager 101 causes one or more of the plurality of parameter fields included in a graphical user interface to be populated with one or more parameters extracted from the data file according to a mapping between the one or more parameters extracted from the raw data file and one or more corresponding parameter fields of the plurality of parameter fields included in the graphical user interface. In some embodiments, the raw data file is based on a template comprising one or more input fields configured to receive the one or more parameters for configuring the network function and information to facilitate the mapping between the one or more parameters extracted from the data file and the one or more corresponding parameter fields of the plurality of parameter fields included in the graphical user interface.

In some embodiments, the configuration manager 101 processes the parameter fields included in the graphical user interface to determine whether all of the parameter fields have content that is based on the mapping of the one or more parameters extracted from the data file or if one or more of the parameter fields included in the graphical user interface is empty. In response to determining one or more of the parameter fields included in the graphical user interface is empty, and determining the one or more parameters extracted from the data file lack a mapping to the one or more of the parameter fields determined to be empty, the configuration manager 101 retrieves one or more database parameters from data storage 103 to fill the one or more of the parameter fields determined to be empty before generating the JSON configuration file In some embodiments, the database parameters correspond to parameters that were previously set or applied for a previous version of the JSON configuration file, set or applied for a previous network function implemented by the network device(s) 105, a previous network function implemented by one or more different network devices 105, or some other suitable basis for filling-in any missing parameter(s) that are designated by the configuration manager 101 as being necessary for generating the JSON configuration file to configure the network function. In some embodiments, the database parameters include one or more preset default values. In some embodiments, the database parameters include a combination of values according to a rule that defines situations in which certain database parameters are to be used instead of other database parameters and/or one or more default values.

In some embodiments, at least one of the parameter fields included in the graphical user interface is configured to be modified based on a user input. In some embodiments, the user input is made by making a selection from a drop-down menu of options, a list of options, an array of options, by making a text input, or in some other suitable manner. For example, if a user would like to change a value in a populated parameter field, the graphical user interface makes it possible to select an alternative option to be used for generating the JSON configuration file. In some embodiments, alternative option(s) are retrieved from the data storage 103 and provided in the graphical user interface in the form or a drop-down menu, list, array, or other suitable manner.

The configuration manager 101 processes parameters included in the parameter fields in the graphical user interface to generate the JSON configuration file. In some embodiments, the graphical user interface is configured to facilitate generating a JSON configuration file that comprises multiple configurations for the network function to be implemented by the network device(s) 105 according to a scheduling parameter included in the data file. In some embodiments, the scheduling parameter is set in the graphical user interface. In some embodiments, the scheduling parameter comprises a day 1 configuration and a day 2 configuration such that the JSON configuration file includes both the day 1 configuration and the day 2 configuration for execution by the recipient network device(s) 105 to implement the network function in accordance with the day 1 configuration and the day 2 configuration without having to separately generate and/or process an individual JSON configuration file for each of day 1 and day 2.

The configuration manager 101 causes the generated JSON configuration file to be sent to the network device(s) 105 to implement the network function in accordance with the JSON configuration file. In some embodiments, the JSON configuration file is sent to the network device(s) 105 to implement the network function by the configuration manager 101 by way of a communication channel free from being intercepted by the network orchestrator 109. In some embodiments, the JSON configuration file is sent directly to the network device(s) 105 to implement the network function by the configuration manager 101. In some embodiments, the JSON configuration file is sent to the network device(s) 105 by way of a UE 107 having connectivity to the configuration manager 101 and a display by which the graphical user interface is output. In some embodiments, the JSON configuration file is optionally downloaded to a UE 107 by which a user is viewing the graphical user interface.

In some embodiments, configuration manager 101 makes it possible for network service providers to download or create a basis .xls-based template that is then filled out with information for various parameters and uploaded to configuration manager 101 to generate a configuration file in JSON format which can be pushed, directly or indirectly, outside of the network orchestrator 109, from the configuration manager 101 based on a selected configuration file, uniform host name, etc. on a respective internet protocol address and port for the network device 105 so there is minimal to zero manual effort required for creating and validating and sending the JSON configuration file. In some embodiments, one or more of the parameters provided in the data file by a network service provider/user are dynamic parameters that are capable of being added and/or modified by the network service provider/user when adding information to the template for producing the data file.

In some embodiments, configuration manager 101 is configured to generate JSON Day1/Day2 configuration files based on given xpath and values (default values), and/or support list type parameters for which a network service provider/user provides a unique identifier or parsing logic (e.g., for list parameters, a key and a value are two parameters coming under specific particular programmable logic device records). In some embodiments, for scenarios in which one or more parameter details are not available or provided by way of data file uploaded or known to a user, the configuration manager 101 generates parameters based on data in data storage 103, retrieves parameters from data storage 103, or provides default values for parameters to facilitate generating the JSON configuration file, even when all of the parameters are unknown to a user that is attempting to generate a JSON configuration file. In some embodiments the template format of the data file provides an opportunity for the network service provider/user to provide parsing logic and/or tags capable of being identified by the configuration manager 101 to facilitate the recognition of the parameters in the data file for parsing and extraction to populate the parameter fields in the graphical user interface.

According to various embodiments, the ability to provide information, add parsing logic, modify parameters, etc. by way of the template/data file, ease of uploading and using the data file to the configuration manager, manipulation capabilities and autonomous generation of the JSON configuration files outside the network orchestrator 109 adds to the network service provider/user ability to control deployment of configuration files in the JSON format to appropriate network devices 105.

According to various embodiments, the ability to define, create and/or push multiple day configurations such as the discussed day 1/day2 options, among others, provides oversight capabilities to network service providers/users over multi-day implementation of network functions for corresponding network devices 105. In some embodiments, the configuration manager 101 receives status updates from the network devices 105 to which a generated JSON configuration file is sent such that the configuration manager 101 is notified regarding whether a network function, a day 1 configuration, day 2 configuration and/or some other day configuration is a success or failure. Such capabilities give the network service provider/user visibility over the success of network function configuration and the success/failure with respect to JSON configuration file(s) created by the network service provider/user.

The configuration manager 101, according, saves time, money and system resources, by reducing or eliminating manual tasks that are typically involved when generating JSON configuration files and validating the same. Moreover, the graphical user interface generated by the configuration manager 101 provides complete visibility for network service providers/users right from configuration generation to configuration push without the need of any orchestrator.

Figure 2:
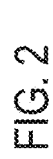
FIG. 2 is a diagram of a graphical user interface, in accordance with one or more embodiments.

FIG. 2 is a diagram of a graphical user interface 200, in accordance with one or more embodiments. Graphical user interface 200 is a configuration manager user interface that includes a configuration file list 201 and a label row 203. The configuration file list 201 is configured to display configuration files 205. For ease of discussion, the configuration file list 201 is shown in FIG. 2 as having one configuration file 205. In some embodiments, the configuration file list 201 includes two or more configuration files 205. In some embodiments, the configuration file list 201 is empty until a configuration file 205 is generated and added to the configuration file list 201.

The configuration file 205 is a JSON configuration file. Configuration files 205 included in the configuration file list 201 are optionally other types of configuration files such as an XML configuration file, or some other suitable file type. The configuration files 205 included in the configuration file list 201 have a plurality of parameters. The parameters of the configuration files 205 correspond to the labels included in the label row 203. In graphical user interface 200, the label row 203 comprise parameter headings for Uniform Host Name (UHN), Network Service (NS) Version, NS Identifier (ID), Technology, Equipment Type, Network Element (NE) Version, Network Function (NF) Type, NF Label, Vendor Domain) or Network Service Provider Domain), Day 1 Configuration Status, Day 2 Configuration Status, and Data Model Type.

Graphical user interface 200 facilitates editing configuration files 205 by selecting a configuration file 205 and toggling an edit icon included in graphical user interface 200, or some other suitable graphical user interface icon. In some embodiments, selecting a configuration file 205 toggles editing the selected configuration file 205. Graphical user interface 200 also facilitates creating a new configuration file 205 by selecting a "+" sign, for example, or some other suitable graphical user interface icon. In some embodiments, in response to selecting a configuration file 205 to be edited or in response to a selection to create a new configuration file 205, configuration manager 101 (FIG. 1) causes graphical user interface 300 (FIG. 3) to be displayed for editing and/or creating a configuration file 205.

In some embodiments, graphical user interface 200 includes a search field and/or a filter option so that a user may search for configuration files 205 included in the configuration file list 201 according to various keywords, parameters, or some other suitable basis for reducing a quantity of configuration files viewable in the configuration file list 201.

Graphical user interface 200 includes a download icon. In response to a selection of a configuration file 205 and a detected toggling of the download icon, configuration manager 101 causes the selected configuration file 205 to be downloaded to a UE 107 (FIG. 1), for example, that is being used to access graphical user interface 200.

Graphical user interface 200 also includes an upload icon. In response to a selection of a configuration file 205 and a detected toggling of the upload icon, configuration manager 101 causes the selected configuration file 205 to be sent, uploaded, or pushed to a corresponding network device 105 (FIG. 1), directly or by way of a UE 107, to implement a network function according to the selected configuration file 205. In some embodiments, the manner, communication channel and/or timing by which the selected configuration file 205 is sent, uploaded or pushed to the corresponding network device 105 is based on an instruction included in the selected configuration file. In some embodiments, the manner, communication channel and/or timing by which the selected configuration file 205 is sent, uploaded or pushed to the corresponding network device 105 is based on a communication rule executed by the configuration manager 101 in response to one or more of the parameters included in the selected configuration file 205.

FIG. 3 is a diagram of a graphical user interface 300, in accordance with one or more embodiments. Graphical user interface 300 is displayed in response to an instruction to add a configuration file or edit a selected configuration fil in graphical user interface 200 (FIG. 2). Graphical user interface 300 includes a plurality of parameter fields for identifying parameters associated with configuring a network function according to the configuration file being added or edited. The parameter fields include options for selecting or entering a UHN Name/UUID (Universal Unique Identifier), Domain, Vendor (or Network Service Provider) information, Technology, Software Version, IP address, and Port Number. In some embodiments, graphical user interface 300 includes an option for configuring additional details such as a Day1 and Day 2 configuration, a sending or pushing instruction, a download instruction, a send-to address, an instruction to push Day 1 and Day 2 configurations directly in sequence, an instruction to push Day1 and Day 2 configurations together in a single configuration file, a scheduling parameter instruction when the configuration manager 101 is to cause the generated configuration file to be sent or pushed to the network device 105, path information instructing how the generated configuration file is to be sent to the network device 105 and/or the UE 107, or some other suitable detail, instruction or rule.

Graphical user interface 300 comprises an upload file workspace 301 into which a data file is uploaded to the configuration manager 101 (FIG. 1) for processing by way of a drag/drop operation. In some embodiments, graphical user interface 300 optionally includes an upload icon to facilitate uploading and sending a data file to the configuration manager 101 for processing.

In use, if a data file uploaded to the configuration manger 101 by way of graphical user interface 300, the configuration manager 101 processes the data file to recognize, parse and extract parameters included in the data file that correspond to the parameter fields included in graphical user interface 200. The configuration manager 101 then causes the parameter fields to be populated with the parameters included in the data file. If, for example, one or more of the parameter fields is empty after populating the parameter fields according to the parameters included in the data file, the configuration manager 101 causes the empty parameter fields to be filled based on one or more of a default value and/or one or more database parameters retrieved from data storage 103 (FIG. 1). In some embodiments, the parameter fields are configured to be edited. In some embodiments, the editing of the parameter fields is done by one or more of a textual input, a drop-down menu, a selection from an array, or some other suitable action by which information in a parameter field may be edited or deleted, or by which information in a parameter field may be added.

After adding, filling or otherwise editing the parameters included in the parameter fields, whether such actions are done based on a user input or based on the parameters included in the uploaded data file, the configuration manager 101 causes a JSON configuration file to be generated in response to a user selection of a "submit" icon, a save icon, or some other suitable user-based instruction or interaction with graphical user interface 300.

The generated JSON configuration file is then added to the configuration file list 201 in graphical user interface 200. If graphical user interface 300 is used to edit a selected configuration file 205, the generated JSON configuration file replaces or updates the selected configuration file 205 included in the configuration file list 201. In some embodiments, the generated JSON configuration file is immediately caused to be sent or pushed to the network device 105 upon submission or saving of the generated JSON configuration file.

Figure 4:
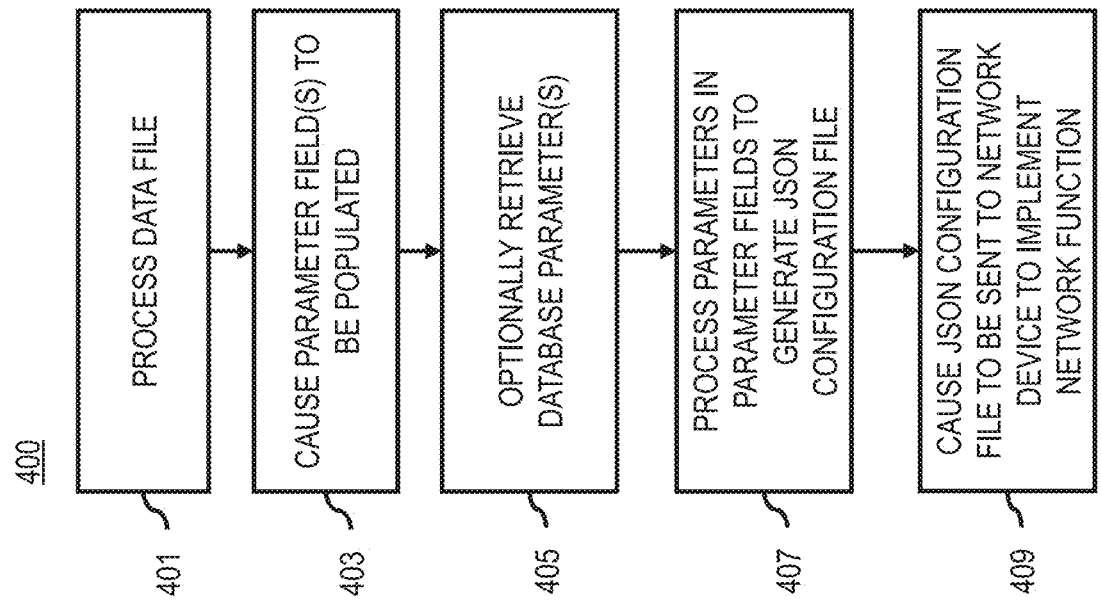
FIG. 4 is a flowchart of a process for generating a JSON configuration file and implementing a network function, in accordance with one or more embodiments.

FIG. 4 is a flowchart of a process 400 for generating a JSON configuration file and implementing a network function, in accordance with one or more embodiments. In some embodiments, the configuration manager 101 (FIG. 1) performs the process 400.

In step 401, the configuration manager 101 processes a data file comprising one or more parameters for configuring a network function provided by a network device. The data file is processed to recognize, parse and extract the one or more parameters included in the data file. In some embodiments, the data file is a raw data file in a binary interchange file format. In some embodiments, the raw data file is based on a template comprising one or more input fields configured to receive the one or more parameters for configuring the network function and information to facilitate a mapping between the one or more parameters extracted from the data file and the one or more corresponding parameter fields of the plurality of parameter fields included in the graphical user interface.

In step 403, the configuration manager 101 causes one or more of a plurality of parameter fields included in a graphical user interface to be populated with the one or more parameters extracted from the data file according to the mapping between the one or more parameters extracted from the data file and one or more corresponding parameter fields of the plurality of parameter fields included in the graphical user interface.

In optional step 405, the configuration manger 101 retrieves one or more database parameters from a data storage such as data storage 103 (FIG. 1) to fill the one or more o parameter fields determined to be empty before generating the JSON configuration file in response to determining one or more of the parameter fields included in the graphical user interface is empty, and determining the one or more parameters extracted from the data file lack a mapping to the one or more of the parameter fields determined to be empty.

In some embodiments, at least one of the parameter fields included in the graphical user interface is configured to be modified based on a user input indicating a selection from a drop-down menu, a list, an array, or a text input.

In step 407, the configuration manager 101 processes parameters included in the parameter fields in the graphical user interface to generate a JSON configuration file. In some embodiments, the graphical user interface is configured to facilitate generating a JSON configuration file that comprises multiple configurations for the network function to be implemented by the network device according to a scheduling parameter included in the data file.

In step 409, the configuration manager 101 causes the JSON configuration file to be sent to the network device to implement the network function in accordance with the JSON configuration file. In some embodiments, the network device is one of a plurality of network devices included in a communication network implemented by a network orchestrator, and the JSON configuration file is generated by a configuration manager external to the network orchestrator. In some embodiments, the JSON configuration file is sent to the network device to implement the network function by the configuration manager by way of a communication channel free from being intercepted by the network orchestrator. In some embodiments, the JSON configuration file is sent directly to the network device to implement the network function by the configuration manager. In some embodiments, the JSON configuration file is sent to the network device by way of a user device having connectivity to the configuration manager and a display by which the graphical user interface is output.

Figure 5:
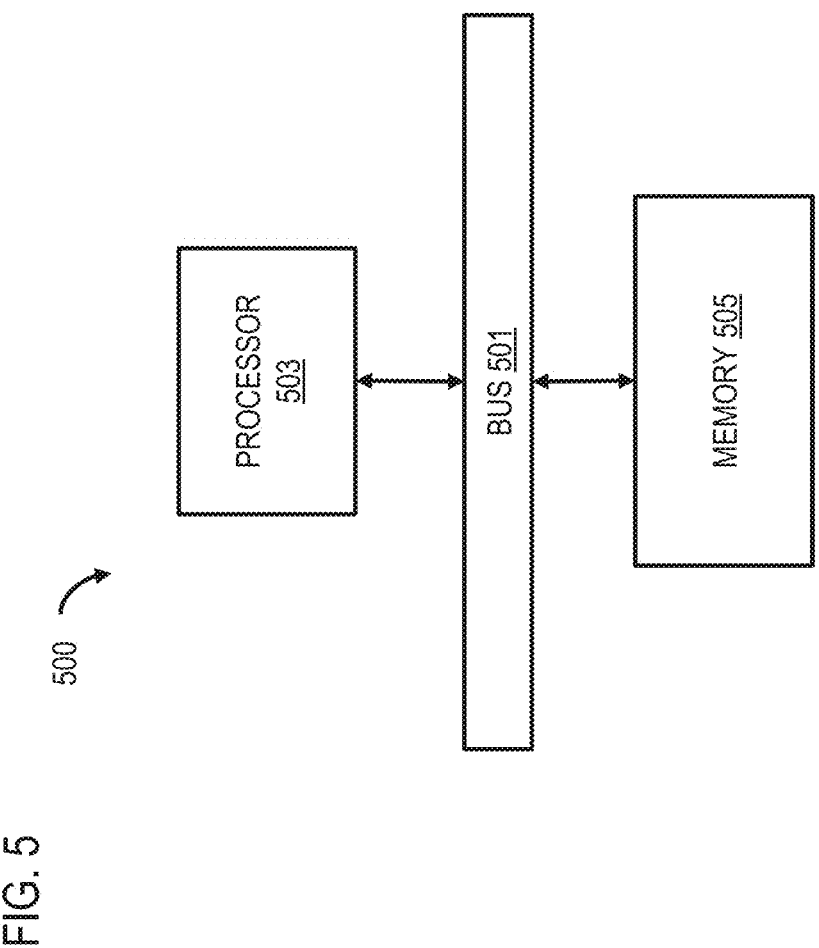
FIG. 5 is a functional block diagram of a computer or processor-based system upon which or by which an embodiment is implemented.

FIG. 5 is a functional block diagram of a computer or processor-based system 500 upon which or by which an embodiment is implemented.

Processor-based system 500 is programmed to generate a JSON configuration file and implement a network function, as described herein, and includes, for example, bus 501, processor 503, and memory 505 components.

In some embodiments, the processor-based system is implemented as a single "system on a chip." Processor-based system 500, or a portion thereof, constitutes a mechanism for performing one or more steps of generating a JSON configuration file and implementing a network function.

In some embodiments, the processor-based system 500 includes a communication mechanism such as bus 501 for transferring and/or receiving information and/or instructions among the components of the processor-based system 500. Processor 503 is connected to the bus 501 to obtain instructions for execution and process information stored in, for example, the memory 505. In some embodiments, the processor 503 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 503. Similarly, an ASIC is configurable to perform specialized functions not easily performed by a more general-purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 503 performs a set of operations on information as specified by a set of instructions stored in memory 505 related to generate a JSON configuration file and implement a network function. The execution of the instructions causes the processor to perform specified functions.

The processor 503 and accompanying components are connected to the memory 505 via the bus 501. The memory 505 includes one or more of dynamic memory (e.g., RAM, magnetic disk, writable optical disk, etc.) and static memory (e.g., ROM, CD-ROM, etc.) for storing executable instructions that when executed perform the steps described herein to generate a JSON configuration file and implement a network function. The memory 505 also stores the data associated with or generated by the execution of the steps.

In one or more embodiments, the memory 505, such as a random-access memory (RAM) or any other dynamic storage device, stores information including processor instructions for generating a JSON configuration file and implementing a network function. Dynamic memory allows information stored therein to be changed. RAM allows a unit of information stored at a location called a memory address to be stored and retrieved independently of information at neighboring addresses. The memory 505 is also used by the processor 503 to store temporary values during execution of processor instructions. In various embodiments, the memory 505 is a read only memory (ROM) or any other static storage device coupled to the bus 501 for storing static information, including instructions, that is not capable of being changed by processor 503. Some memory is composed of volatile storage that loses the information stored thereon when power is lost. In some embodiments, the memory 505 is a non-volatile (persistent) storage device, such as a magnetic disk, optical disk, or flash card, for storing information, including instructions, that persists even when the system 500 is turned off or otherwise loses power.

The term "computer-readable medium" as used herein refers to any medium that participates in providing information to processor 503, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

An aspect of this description is related to a method that comprises processing, by a processor, a data file comprising one or more parameters for configuring a network function provided by a network device. The data file is processed to recognize and extract the one or more parameters included in the data file. The method also comprises causing one or more of a plurality of parameter fields included in a graphical user interface to be populated with the one or more parameters extracted from the data file according to a mapping between the one or more parameters extracted from the data file and one or more corresponding parameter fields of the plurality of parameter fields included in the graphical user interface. The method further comprises processing parameters included in the parameter fields in the graphical user interface to generate a JavaScript Object Notation (JSON) configuration file. The method additionally comprises causing the JSON configuration file to be sent to the network device to implement the network function in accordance with the JSON configuration file.

Another aspect of this description is related to an apparatus comprising a processor and a memory having instructions stored thereon that, when executed by the processor, cause the apparatus to process a data file comprising one or more parameters for configuring a network function provided by a network device. The data file is processed to recognize and extract the one or more parameters included in the data file. The apparatus is also caused to cause one or more of a plurality of parameter fields included in a graphical user interface to be populated with the one or more parameters extracted from the data file according to a mapping between the one or more parameters extracted from the data file and one or more corresponding parameter fields of the plurality of parameter fields included in the graphical user interface. The apparatus is further caused to process parameters included in the parameter fields in the graphical user interface to generate a JavaScript Object Notation (JSON) configuration file. The apparatus is additionally caused to cause the JSON configuration file to be sent to the network device to implement the network function in accordance with the JSON configuration file.

Another aspect of this description is related to a non-transitory computer readable having instructions stored thereon that, when executed by a processor, cause an apparatus to process a data file comprising one or more parameters for configuring a network function provided by a network device. The data file is processed to recognize and extract the one or more parameters included in the data file. The apparatus is also caused to cause one or more of a plurality of parameter fields included in a graphical user interface to be populated with the one or more parameters extracted from the data file according to a mapping between the one or more parameters extracted from the data file and one or more corresponding parameter fields of the plurality of parameter fields included in the graphical user interface. The apparatus is further caused to process parameters included in the parameter fields in the graphical user interface to generate a JavaScript Object Notation (JSON) configuration file. The apparatus is additionally caused to cause the JSON configuration file to be sent to the network device to implement the network function in accordance with the JSON configuration file.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    processing, by a processor, a data file comprising one or more parameters for configuring a network function provided by a network device, wherein the data file is processed to recognize and extract the one or more parameters included in the data file;
    causing one or more of a plurality of parameter fields included in a graphical user interface to be populated with the one or more parameters extracted from the data file according to a mapping between the one or more parameters extracted from the data file and one or more corresponding parameter fields of the plurality of parameter fields included in the graphical user interface, wherein the graphical user interface is configured to facilitate generating a single JavaScript Object Notation (JSON) configuration file that comprises a first configuration and a second configuration, where the first configuration and the second configuration indicate settings for the network function to be implemented by the network device at different times;
    processing parameters included in the parameter fields in the graphical user interface to generate the single JSON configuration file; and
    causing the single JSON configuration file to be sent to the network device to implement the network function in accordance with the single JSON configuration file.

2. The method of claim 1, further comprising:
    in response to determining one or more of the parameter fields included in the graphical user interface is empty, and determining the one or more parameters extracted from the data file lack a mapping to the one or more of the parameter fields determined to be empty, retrieving one or more database parameters to fill the one or more of the parameter fields determined to be empty before generating the single JSON configuration file.

3. The method of claim 1, wherein the data file is a raw data file in a binary interchange file format.

4. The method of claim 3, wherein the raw data file is based on a template comprising one or more input fields configured to receive the one or more parameters for configuring the network function and information to facilitate the mapping between the one or more parameters extracted from the data file and the one or more corresponding parameter fields of the plurality of parameter fields included in the graphical user interface.

5. The method of claim 1, wherein the at least one of the parameter fields included in the graphical user interface is configured to be modified based on a user input indicating a selection from a drop-down menu, a list, an array, or a text input.

6. The method of claim 1, wherein the network device is one of a plurality of network devices included in a communication network implemented by a network orchestrator, and the single JSON configuration file is generated by a configuration manager external to the network orchestrator.

7. The method of claim 6, wherein the single JSON configuration file is sent to the network device to implement the network function by the configuration manager by way of a communication channel free from being intercepted by the network orchestrator.

8. The method of claim 6, wherein the single JSON configuration file is sent directly to the network device to implement the network function by the configuration manager.

9. The method of claim 6, wherein the single JSON configuration file is sent to the network device by way of a user device having connectivity to the configuration manager and a display by which the graphical user interface is output.

10. The method of claim 1, wherein the first configuration and the second configuration for the network function are implemented by the network device according to a scheduling parameter included in the data file.

11. An apparatus, comprising:
    a processor; and
    a memory having instructions stored thereon that, when executed by the processor, cause the apparatus to:
    process a data file comprising one or more parameters for configuring a network function provided by a network device, wherein the data file is processed to recognize and extract the one or more parameters included in the data file;
    cause one or more of a plurality of parameter fields included in a graphical user interface to be populated with the one or more parameters extracted from the data file according to a mapping between the one or more parameters extracted from the data file and one or more corresponding parameter fields of the plurality of parameter fields included in the graphical user interface, wherein the graphical user interface is configured to facilitate generating a single JavaScript Object Notation (JSON) configuration file that comprises a first configuration and a second configuration, where the first configuration and the second configuration indicate settings for the network function to be implemented by the network device at different times;

process parameters included in the parameter fields in the graphical user interface to generate the single JSON configuration file; and cause the single JSON configuration file to be sent to the network device to implement the network function in accordance with the single JSON configuration file.

12. The apparatus of claim 11, wherein the apparatus is further caused to:

in response to determining one or more of the parameter fields included in the graphical user interface is empty, and determining the one or more parameters extracted from the data file lack a mapping to the one or more of the parameter fields determined to be empty, retrieve one or more database parameters to fill the one or more of the parameter fields determined to be empty before generating the single JSON configuration file.

13. The apparatus of claim 11, wherein the data file is a raw data file in a binary interchange file format.

14. The apparatus of claim 13, wherein the raw data file is based on a template comprising one or more input fields configured to receive the one or more parameters for configuring the network function and information to facilitate the mapping between the one or more parameters extracted from the data file and the one or more corresponding parameter fields of the plurality of parameter fields included in the graphical user interface.

15. The apparatus of claim 11 wherein the at least one of the parameter fields included in the graphical user interface is configured to be modified based on a user input indicating a selection from a drop-down menu, a list, an array, or a text input.

16. The apparatus of claim 11, wherein the network device is one of a plurality of network devices included in a communication network implemented by a network orchestrator, and the single JSON configuration file is generated by a configuration manager external to the network orchestrator.

17. The apparatus of claim 16, wherein the single JSON configuration file is sent to the network device to implement the network function by the configuration manager by way of a communication channel free from being intercepted by the network orchestrator.

18. The apparatus of claim 16, wherein the single JSON configuration file is sent directly to the network device to implement the network function by the configuration manager.

19. The apparatus of claim 11, wherein the first configuration and the second configuration for the network function are implemented by the network device according to a scheduling parameter included in the data file.

20. A non-transitory computer readable medium having instructions stored thereon that, when executed by a processor, cause an apparatus to:

process a data file comprising one or more parameters for configuring a network function provided by a network device, wherein the data file is processed to recognize and extract the one or more parameters included in the data file;

cause one or more of a plurality of parameter fields included in a graphical user interface to be populated with the one or more parameters extracted from the data file according to a mapping between the one or more parameters extracted from the data file and one or more corresponding parameter fields of the plurality of parameter fields included in the graphical user interface, wherein the graphical user interface is configured to facilitate generating a single JavaScript Object Notation (JSON) configuration file that comprises a first configuration and a second configuration, where the first configuration and the second configuration indicate settings for the network function to be implemented by the network device at different times;

process parameters included in the parameter fields in the graphical user interface to generate the single JSON configuration file; and cause the single JSON configuration file to be sent to the network device to implement the network function in accordance with the single JSON configuration file.

* * * * *